United States Patent
Lee et al.

(10) Patent No.: US 9,847,093 B2
(45) Date of Patent: Dec. 19, 2017

(54) METHOD AND APPARATUS FOR PROCESSING SPEECH SIGNAL

(71) Applicants: SAMSUNG ELECTRONICS CO., LTD., Suwon-si, Gyeonggi-do (KR); INDUSTRY-UNIVERSITY COOPERATION FOUNDATION HANYANG UNIVERSITY, Seoul (KR)

(72) Inventors: Kang-eun Lee, Hwaseong-si (KR); Joon-hyuk Chang, Seoul (KR); Byeong-yong Jeon, Suwon-si (KR); Hyeon-seong Kim, Hwaseong-si (KR); Tae-jun Park, Seoul (KR); Kwang-sub Song, Seoul (KR); Tae-hyun Yoon, Suwon-si (KR); Seong-hyeon Choe, Seoul (KR); Hyun-chul Choi, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/181,716

(22) Filed: Jun. 14, 2016

(65) Prior Publication Data
US 2016/0372135 A1    Dec. 22, 2016

Related U.S. Application Data

(60) Provisional application No. 62/182,021, filed on Jun. 19, 2015.

(30) Foreign Application Priority Data

Jul. 28, 2015  (KR) .................. 10-2015-0106774

(51) Int. Cl.
*G09B 21/00*    (2006.01)
*G06F 1/16*    (2006.01)
(Continued)

(52) U.S. Cl.
CPC .......... *G10L 21/0364* (2013.01); *G10L 19/00* (2013.01); *G10L 19/06* (2013.01);
(Continued)

(58) Field of Classification Search
CPC . G10L 21/02; G10L 21/0202; G10L 21/0208; G10L 2021/02082; G10L 21/06;
(Continued)

(56) References Cited

U.S. PATENT DOCUMENTS 4,142,067 A * 2/1979 Williamson ............ G10L 25/90
                                                      704/258
4,882,758 A * 11/1989 Uekawa .................. G10L 25/00
                                                      704/209
(Continued)

FOREIGN PATENT DOCUMENTS

JP    2000-049935    2/2000
JP    2002-507291    3/2002
(Continued)

OTHER PUBLICATIONS

Office Action dated Apr. 6, 2017 in counterpart Korean Patent Application No. 10-2015-0106774 and English-language translation of same.

(Continued)

*Primary Examiner* — Eric Yen
(74) *Attorney, Agent, or Firm* — Nixon & Vanderhye, P.C.

(57) ABSTRACT

An apparatus for processing a speech signal is provided. The apparatus includes a communicator comprising communication circuitry configured to transmit and receive data, an actuator comprising actuation circuitry configured to generate vibration and to output a signal, a formant enhancement filter configured to increase a formant of the speech signal, and a controller comprising processing circuitry configured to control the speech signal to be received through the communicator, to estimate at least one formant frequency from the speech signal based on linear predictive coding (LPC), to estimate a bandwidth of the at least one formant frequency, to determine whether the speech signal is a voiced sound or a voiceless sound, to configure the formant enhancement filter based on the at least one formant frequency, the bandwidth of the at least one formant frequency, (Continued)

characteristics of the determined voiced sound or voiceless sound, and signal delivery characteristics of a human body, to apply the formant enhancement filter to the speech signal, and to control the speech signal to which the formant enhancement filter is applied to be output using the actuator through the human body.

18 Claims, 8 Drawing Sheets

(51) Int. Cl.
| | | |
|---|---|---|
| G06F 3/01 | (2006.01) | |
| G10L 21/18 | (2013.01) | |
| G10L 21/003 | (2013.01) | |
| G10L 21/06 | (2013.01) | |
| G10L 21/057 | (2013.01) | |
| G10L 21/0264 | (2013.01) | |
| G10L 21/0364 | (2013.01) | |
| G10L 25/15 | (2013.01) | |
| G10L 25/78 | (2013.01) | |
| G10L 19/06 | (2013.01) | |
| G10L 21/0388 | (2013.01) | |
| G10L 19/00 | (2013.01) | |
| G10L 25/93 | (2013.01) | |
| G10L 21/0208 | (2013.01) | |

(52) U.S. Cl.
CPC ........ *G10L 21/003* (2013.01); *G10L 21/0264* (2013.01); *G10L 21/0388* (2013.01); *G10L 21/057* (2013.01); *G10L 21/06* (2013.01); *G10L 21/18* (2013.01); *G10L 25/15* (2013.01); *G10L 25/78* (2013.01); *G10L 25/93* (2013.01); *G06F 1/163* (2013.01); *G06F 3/014* (2013.01); *G09B 21/00* (2013.01); *G10L 2021/02082* (2013.01)

(58) Field of Classification Search
CPC ... G10L 2021/065; G10L 21/10; G10L 21/16; G10L 21/18; G10L 25/12; G10L 25/15; G10L 25/21; G10L 25/48; G10L 25/72; G10L 25/78; G10L 2025/783; G10L 25/84; G10L 25/93; G10L 2025/932; G06F 1/163; G06F 3/014; G09B 21/00
See application file for complete search history.

(56) References Cited

U.S. PATENT DOCUMENTS

| | | | | |
|---|---|---|---|---|
| 4,945,568 A * | 7/1990 | Willems | ............... | G10L 25/48 704/209 |
| 5,325,462 A * | 6/1994 | Farrett | ............... | G10L 13/033 704/258 |
| 5,444,741 A * | 8/1995 | Mahieux | ............... | G10L 21/02 375/254 |
| 5,459,813 A * | 10/1995 | Klayman | ............... | G10L 21/0364 381/82 |
| 5,953,696 A * | 9/1999 | Nishiguchi | ......... | G10L 21/0364 704/209 |
| 6,463,406 B1 * | 10/2002 | McCree | ............... | G10L 25/90 704/207 |
| 6,505,152 B1 * | 1/2003 | Acero | ............... | G10L 13/04 704/201 |
| 6,912,287 B1 * | 6/2005 | Fukumoto | ............ | G06F 1/163 379/430 |
| 6,993,480 B1 | 1/2006 | Klayman | | |
| 7,120,579 B1 | 10/2006 | Licht | | |
| 7,536,020 B2 | 5/2009 | Fukumoto et al. | | |
| 8,218,397 B2 | 7/2012 | Chan | | |
| 8,694,326 B2 | 4/2014 | Miyasaka et al. | | |
| 9,117,455 B2 | 8/2015 | Tracey et al. | | |
| 2002/0016698 A1 * | 2/2002 | Tokuda | ............... | G10L 21/038 702/190 |
| 2002/0194002 A1 * | 12/2002 | Petrushin | ............ | G10L 17/26 704/270 |
| 2005/0185813 A1 * | 8/2005 | Sinclair | ............... | G10L 21/0208 381/380 |
| 2005/0222845 A1 * | 10/2005 | Nakagawa | ......... | G10L 21/0364 704/271 |
| 2005/0244020 A1 * | 11/2005 | Nakajima | ............ | G10L 15/24 381/151 |
| 2006/0080087 A1 * | 4/2006 | Vandali | ............... | A61N 1/36032 704/207 |
| 2006/0149532 A1 * | 7/2006 | Boillot | ............... | G10L 19/26 704/203 |
| 2007/0105072 A1 * | 5/2007 | Koljonen | ............ | H04M 1/72527 434/112 |
| 2007/0255535 A1 * | 11/2007 | Marro | ............... | G10L 21/02 702/194 |
| 2009/0052698 A1 * | 2/2009 | Rader | ............... | H04R 25/606 381/151 |
| 2009/0138062 A1 * | 5/2009 | Balslev | ............... | A61B 5/123 607/55 |
| 2010/0328033 A1 * | 12/2010 | Kamei | ............... | A61B 8/0875 340/5.82 |
| 2011/0075832 A1 * | 3/2011 | Tashiro | ............... | G10L 21/038 379/392.01 |
| 2011/0319703 A1 | 12/2011 | Wiskerke et al. | | |
| 2012/0173247 A1 * | 7/2012 | Sung | ............... | G10L 19/002 704/500 |
| 2012/0209132 A1 * | 8/2012 | Jones | ............... | A61B 7/026 600/528 |
| 2012/0209603 A1 * | 8/2012 | Jing | ............... | G10L 21/0364 704/233 |
| 2012/0278070 A1 * | 11/2012 | Herve | ............... | G10L 21/0208 704/226 |
| 2013/0216065 A1 | 8/2013 | Nguyen | | |
| 2013/0225999 A1 * | 8/2013 | Banjanin | ............ | A61B 8/467 600/443 |
| 2013/0275126 A1 * | 10/2013 | Lee | ............... | G10L 21/003 704/205 |
| 2013/0332156 A1 * | 12/2013 | Tackin | ............... | H04M 1/6041 704/226 |
| 2014/0045463 A1 | 2/2014 | Hsieh et al. | | |
| 2014/0093093 A1 * | 4/2014 | Dusan | ............... | H04R 3/005 381/74 |
| 2015/0245129 A1 * | 8/2015 | Dusan | ............... | H04R 1/1083 381/71.6 |
| 2015/0325251 A1 * | 11/2015 | Dusan | ............... | G10L 21/0208 704/226 |
| 2015/0343214 A1 * | 12/2015 | Yamazaki | ............ | A61N 1/36 607/48 |
| 2016/0300585 A1 * | 10/2016 | Wu | ............... | G10L 21/003 |

FOREIGN PATENT DOCUMENTS

| | | |
|---|---|---|
| JP | 2012-147077 | 8/2012 |
| JP | 5424936 | 12/2013 |
| JP | 2014-175776 | 9/2014 |
| KR | 10-0778143 | 11/2007 |
| KR | 10-0860805 | 9/2008 |
| KR | 10-2014-050951 | 4/2014 |
| KR | 10-2014-0079363 | 6/2014 |
| WO | WO 93/21876 | 11/1993 |

OTHER PUBLICATIONS

Notice of Final Rejection dated Aug. 28, 2017 in counterpart Korean Patent Application No. 10-2015-0106774 and English-language translation thereof.

\* cited by examiner

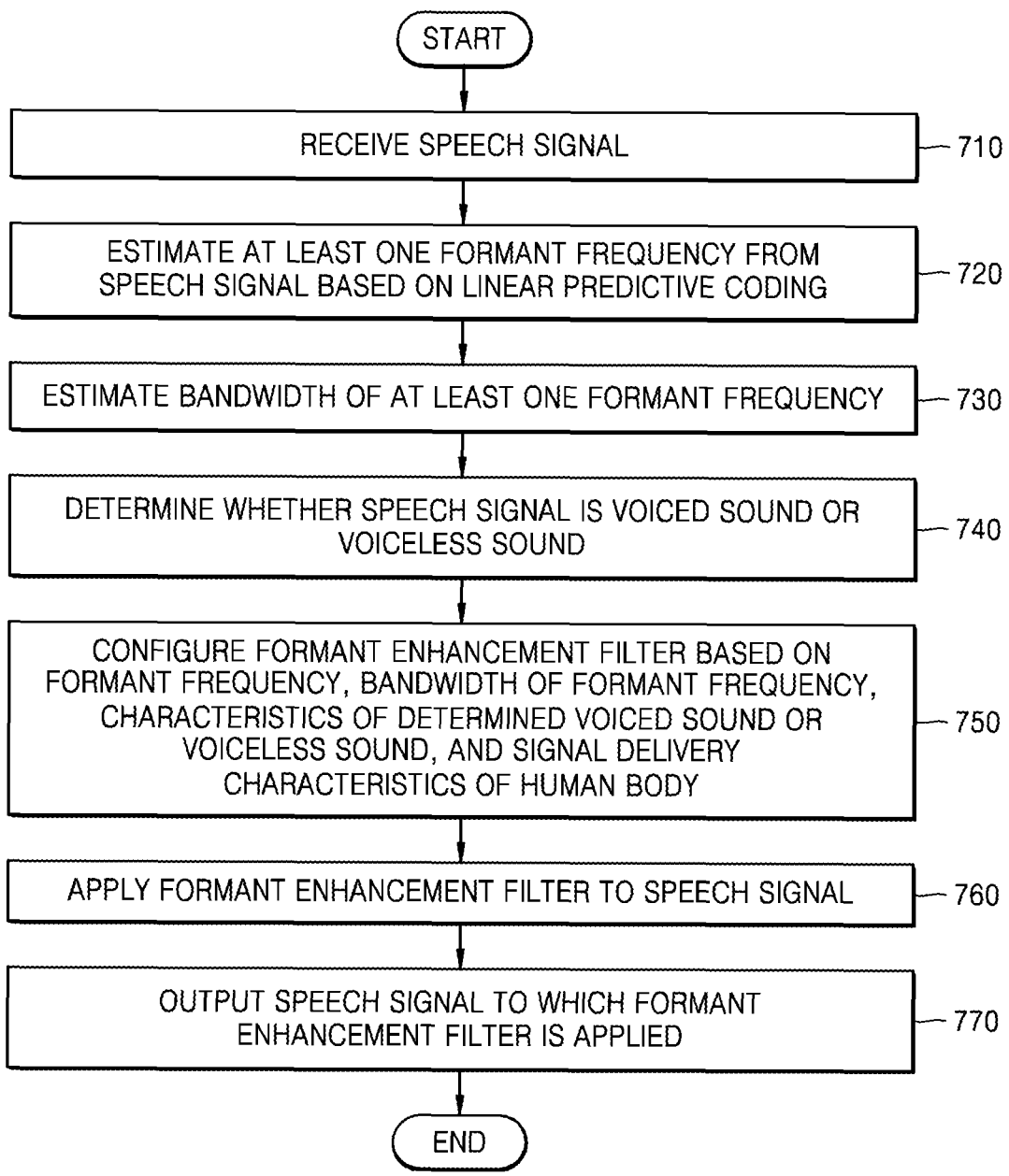

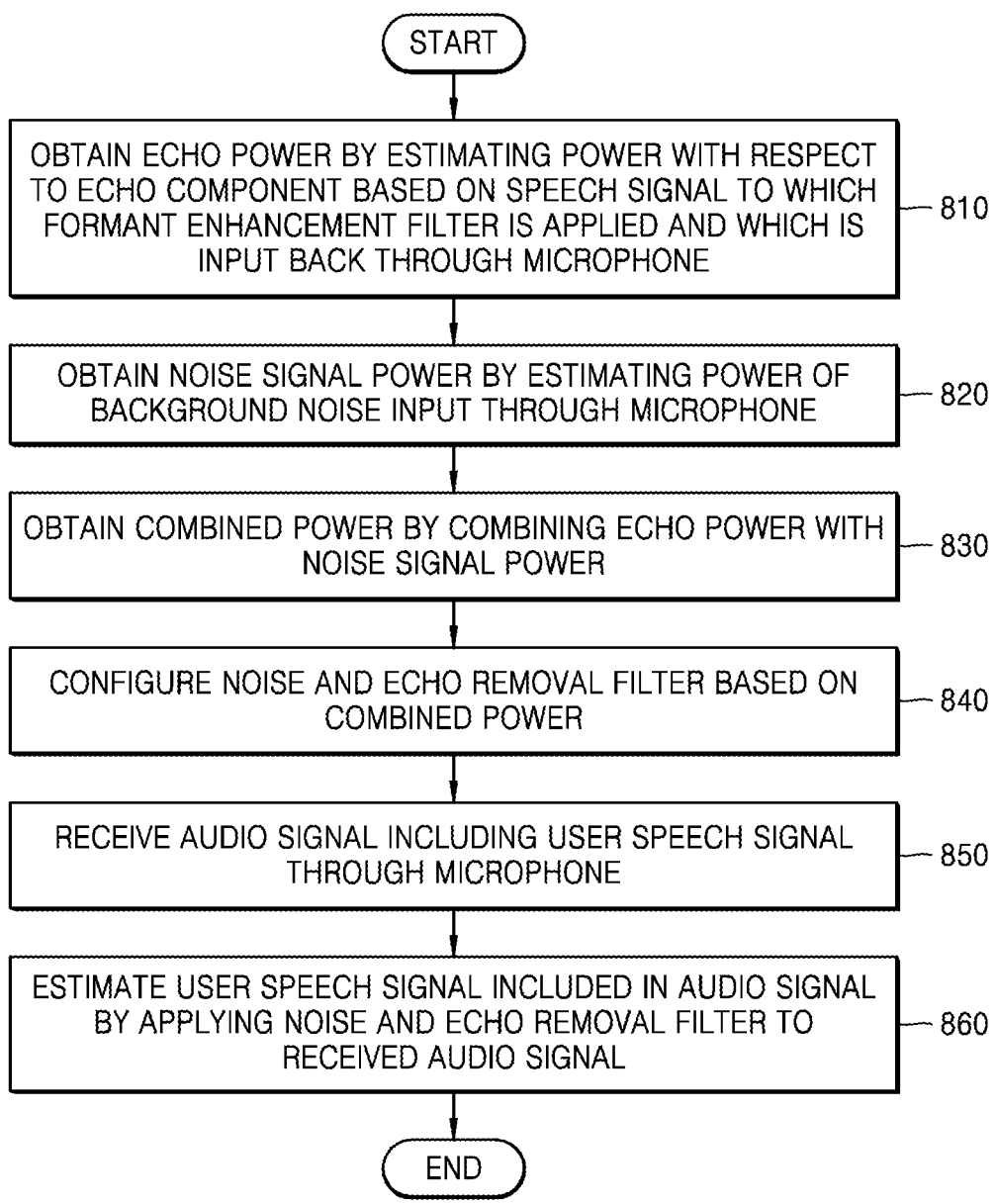

METHOD AND APPARATUS FOR PROCESSING SPEECH SIGNAL

CROSS-REFERENCE TO RELATED APPLICATIONS

This application is based on and claims priority under 35 U.S.C. §119 to U.S. Provisional Application No. 62/182,021, filed on Jun. 19, 2015, in the US Patent Office and Korean Patent Application No. 10-2015-0106774, filed on Jul. 28, 2015, in the Korean Intellectual Property Office, the disclosures of which are incorporated by reference herein in their entireties.

BACKGROUND

1. Field

The present disclosure relates to methods and apparatuses for processing a speech signal, and for example, to methods and apparatuses for processing a speech signal using a human body as a medium.

2. Description of Related Art

With recent advances in mobile device-related technologies such as smartphones, tablet personal computers (PCs), and so forth, a technique for delivering an audio signal through a human body used as a medium, by using a mobile device has been studied. In particular, attention is increasingly been given to a technique for operating a wearable device wearable on a human body in cooperation with a mobile device such as a smartphone or tablet PC and delivering a speech signal through the human body used as a medium, by using the wearable device.

In the case of communication using a wearable device, the wearable device delivers speech or voice received from a communication counterpart through a user's body and transmits speech or voice of the user to the counterpart. In this case, if the wearable device outputs a received speech signal in the form of a vibration, the vibration is delivered through the body and by bringing a body part on which the user wears the wearable device into contact with the ear of the user, the user may hear the speech signal delivered through vibration. However, when vibration is delivered through the body, loss may occur in the delivered speech signal or the delivered speech signal may sound unclear due to being contaminated by noise, depending on medium characteristics of the body.

The user may also transmit a speech signal to the counterpart through a microphone mounted on the wearable device. The wearable device uses a strong vibration to apply an audio signal to the body, and when the user inputs the speech signal through the microphone, a generated vibration is input again to the microphone together with the speech signal, causing an echo and thus degrading sound quality.

Therefore, when a speech signal is delivered and input by using a body as a medium, proper processing of the speech signal is required.

SUMMARY

Methods and apparatuses for processing a speech signal, by which a speech signal may be delivered using a human body as a medium, while improving sound quality are provided.

Methods and apparatuses for processing a speech signal are provided, in which when a speech signal is delivered using a human body as a medium, sound quality degraded due to medium characteristics of the human body may be improved, thereby enhancing clarity of the speech signal.

Methods and apparatuses for processing a speech signal are provided, by which an echo generated by vibration may be removed and/or reduced.

Additional aspects will be set forth in part in the description which follows and, in part, will be apparent from the description.

According to an exemplary embodiment, an apparatus for processing a speech signal includes a communicator including communication circuitry, the communicator configured to transmit and receive data, an actuator configured to generate vibration and to output a signal, a first filter configured to increase a formant of the speech signal (hereinafter referred to generally as a formant enhancement filter), and a controller configured to control the speech signal to be received through the communicator, to estimate at least one formant frequency from the speech signal based on linear predictive coding (LPC), to estimate a bandwidth of the at least one formant frequency, to determine whether the speech signal is a voiced sound or a voiceless sound, to configure the formant enhancement filter based on the at least one formant frequency, the bandwidth of the at least one formant frequency, characteristics of the determined voiced sound or voiceless sound, and signal delivery characteristics of a human body, to apply the formant enhancement filter to the speech signal, and to control the speech signal to which the formant enhancement filter is applied to be output using the actuator through the human body.

When the controller estimates the at least one formant frequency, the controller may be further configured to obtain LPC coefficients (LPCCs) through LPC analysis, to obtain an LPC envelope based on the LPCCs, and to estimate, as the at least one formant frequency, a frequency at which a slope of the LPC envelope becomes a negative value from a positive value.

When the controller estimates the at least one formant frequency, the controller may be further configured to estimate the bandwidth of the at least one formant frequency based on the LPCCs.

When the controller determines whether the speech signal is the voiced sound or the voiceless sound, the controller may be further configured to determine based on the LPC envelope whether the speech signal is the voiced sound or the voiceless sound.

The formant enhancement filter may be implemented with a window function that reinforces a gain of a formant frequency band.

The apparatus may further include a microphone configured to receive an audio signal and a second filter configured to remove a noise component and an echo component of the audio signal (hereinafter referred to generally as a noise and echo removal filter), in which the controller may be further configured to obtain echo power by estimating power with respect to the echo component based on a speech signal to which the formant enhancement filter is applied and which is input back through the microphone, to obtain noise signal power by estimating power of a background noise input through the microphone, to obtain combined power by combining the echo power with the noise signal power, to configure the noise and echo removal filter based on the combined power, to receive the audio signal comprising a user speech signal through the microphone, and to estimate the user speech signal included in the audio signal by applying the noise and echo removal filter to the received audio signal.

When the controller obtains the echo power, the controller may be further configured to estimate a gain value filter based on the speech signal to which the formant enhancement filter is applied, to obtain a magnitude spectrum of the echo component using the estimated gain value filter, and to obtain current echo power by performing smoothing using the obtained magnitude spectrum and echo power previously estimated.

When the controller obtains the combined power by combining the echo power with the noise signal power, the controller may be further configured to obtain current combined power by performing smoothing using the echo power, the noise signal power, and previously combined power.

When the controller configures the noise and echo removal filter based on the combined power, the controller may be further configured to estimate a first priori signal-to-combined power ratio (SCR) and a posteriori SCR based on the combined power, estimate a second priori SCR in a decision-direction way based on the combined power, the posteriori SCR, and power of a previous speech signal, and to configure the noise and echo removal filter based on the second priori SCR.

When the controller estimates the user speech signal included in the audio signal, the controller may be further configured to compare the posteriori SCR with a threshold value for the posteriori SCR to determine an indicator function value, to estimate a prior probability of a current speech being absent based on the indicator function value and the prior probability of the previous speech signal being absent, to determine a likelihood ratio based on the first prior SCR, the posteriori SCR, and the second prior SCR, to determine a probability of a speech signal being present based on the prior probability of the current speech signal being absent and the likelihood ratio, and to estimate the user speech signal based on the noise and echo removal filter and the probability of the speech signal being present.

According to an aspect of another exemplary embodiment, a method of processing a speech signal includes receiving a speech signal, estimating at least one formant frequency from the speech signal based on LPC, estimating a bandwidth of the at least one formant frequency, determining whether the speech signal is a voiced sound or a voiceless sound, configuring a formant enhancement filter based on the at least one formant frequency, the bandwidth of the at least one formant frequency, characteristics of the determined voiced sound or voiceless sound, and signal delivery characteristics of a human body, applying the formant enhancement filter to the speech signal, and outputting the speech signal to which the formant enhancement filter is applied through the human body.

The estimating of the at least one formant frequency may include obtaining LPCCs through LPC analysis, obtaining an LPC envelope based on the LPCCs, and estimating, as the at least one formant frequency, a frequency at which a slope of the LPC envelope becomes a negative value from a positive value.

The estimating of the bandwidth of the at least one formant frequency may include estimating the bandwidth of the at least one formant frequency based on the LPCCs.

The determining of whether the speech signal is the voiced sound or the voiceless sound may include determining based on the LPC envelope whether the speech signal is the voiced sound or the voiceless sound.

The formant enhancement filter may be implemented with a window function that reinforces a gain of a formant frequency band.

The method may further include obtaining echo power by estimating power with respect to the echo component based on a speech signal to which the formant enhancement filter is applied and which is input back through a microphone, obtaining noise signal power by estimating power of a background noise input through the microphone, obtaining combined power by combining the echo power with the noise signal power, configuring the noise and echo removal filter based on the combined power, receiving the audio signal comprising a user speech signal through the microphone, and estimating the user speech signal included in the audio signal by applying the noise and echo removal filter to the received audio signal.

The obtaining of the echo power may include estimating a gain value filter based on the speech signal to which the formant enhancement filter is applied, obtaining a magnitude spectrum of the echo component by using the estimated gain value filter, and obtaining current echo power by performing smoothing using the obtained magnitude spectrum and echo power previously estimated.

The obtaining of the combined power by combining the echo power with the noise signal power may include obtaining current combined power by performing smoothing using the echo power, the noise signal power, and previously combined power.

The configuring of the noise and echo removal filter based on the combined power may include estimating a first priori signal-to-combined power ratio (SCR) and a posteriori SCR based on the combined power, estimating a second priori SCR in a decision-direction way based on the combined power, the posteriori SCR, and power of a previous speech signal, and configuring the noise and echo removal filter based on the second priori SCR.

The estimating of the user speech signal included in the audio signal may include comparing the posteriori SCR with a threshold value for the posteriori SCR to determine an indicator function value, estimating a prior probability of a current speech being absent based on the indicator function value and the prior probability of the previous speech signal being absent, determining a likelihood ratio based on the first prior SCR, the posteriori SCR, and the second prior SCR, determining a probability of a speech signal being present based on the prior probability of the current speech signal being absent and the likelihood ratio, and estimating the user speech signal based on the noise and echo removal filter and the probability of the speech signal being present.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 7 is a flowchart illustrating a method of applying a formant enhancement filter to a speech signal and outputting a resulting signal according to an exemplary embodiment; and FIG. 8 is a flowchart illustrating a method of removing an echo according to an exemplary embodiment.

DETAILED DESCRIPTION

Figure 1:
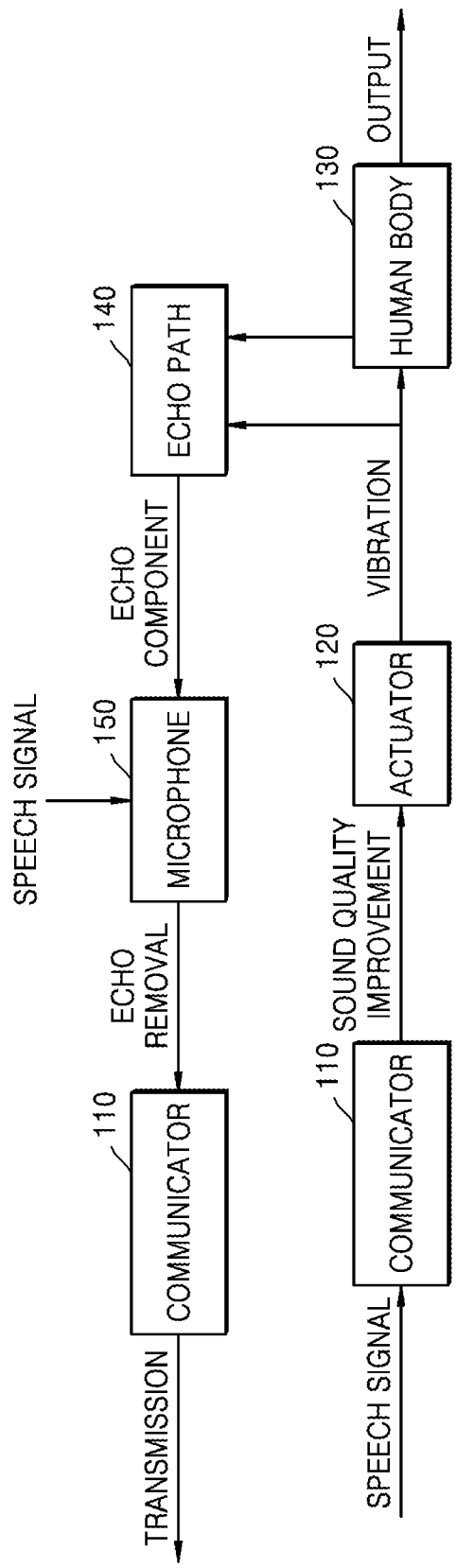
FIG. 1 is a schematic block diagram illustrating a speech signal processing according to an exemplary embodiment.

Reference will now be made in greater detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are simply described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

Terms used herein will be described in brief and exemplary embodiments will be described in greater detail.

Although the terms used herein are generic terms which are currently widely used and are selected by taking into consideration functions thereof, the meanings of the terms may vary according to the intentions those of ordinary skill in the art or the emergence of new technologies. Furthermore, some specific terms may be arbitrarily selected, in which case the meanings of the terms may be specifically defined in or gleaned from the description of the exemplary embodiment. Thus, the terms should be defined based on the meanings thereof and the context of the description of the exemplary embodiment.

Throughout the disclosure, when a part "comprises", "includes", or "has" an element, it means that the part further comprises, includes, or has another element rather than precludes the presence or addition of the another element. A term of a "unit" or a "module" used herein means a hardware element such as, for example, hardware circuitry, a field programmable gate array (FPGA) or an application specific integrated circuit (ASIC), and the module performs some functions. However, the module is not limited to mean only software or hardware. The module may be configured to be embedded in addressable storage media or to operate one or more processors (e.g., including processing circuitry). Accordingly, the module includes elements such as software elements, object-oriented software elements, class elements and task elements, processes, functions, attributions, procedures, subroutines, segments of program codes, drivers, firmware, microcode, circuits, data, databases, data structures, tables, arrays and/or variables. Functions provided in the elements and the modules may be associated with a smaller number of elements and modules or be separated into additional elements and modules.

Hereinafter, the exemplary embodiments will be described in greater detail with reference to the accompanying drawings to allow those of ordinary skill in the art to easily understand the exemplary embodiments. However, the exemplary embodiments may be implemented in various different forms without being limited to the exemplary embodiments disclosed herein. To clearly describe the exemplary embodiments, any part that is not related to the description may be omitted from the drawings.

FIG. 1 is a schematic block diagram illustrating a speech signal processing according to an exemplary embodiment.

Referring to FIG. 1, a communicator (e.g., including communication circuitry) 110 receives a speech signal from an external device, for example, a mobile device such as a smartphone and a tablet personal computer (PC), or the like. The received speech signal is delivered to an actuator (e.g., including actuator circuitry) 120 through a sound quality improvement process. In an exemplary embodiment, the sound quality improvement process is a process of pre-processing a speech signal before outputting the speech signal in the form of a vibration from the actuator 120, to improve sound quality that may be deteriorated due to medium characteristics of a human body. As such, by previously reinforcing a part of the speech signal, in which quality may be deteriorated during signal delivery, by performing pre-speech signal processing before outputting the speech signal in the form of vibration, clarity of the speech signal may be enhanced despite slight sound quality deterioration during signal delivery.

The actuator 120 receives the speech signal passing through the sound quality improvement process, generates a vibration, and outputs a signal corresponding to the vibration to a human body 130. Once the vibration passes through the human body 130, sound quality deterioration occurs due to medium characteristics of the human body 130. As stated above, the signal output through the vibration from the actuator 120 is a speech signal which has already been reinforced to compensate for probable sound quality degradation. Thus, according to an exemplary embodiment, even the speech signal passing through the human body 130 in the form of a vibration may be output as a clear speech signal.

An echo path 140 may, for example, be a path along which an echo component, which causes an echo in an audio signal, is delivered to a microphone 150. The vibration generated in the actuator 120 may be delivered to the microphone 150 after passing through the air, a structure of an apparatus for processing a speech signal, or the like, or being reflected from the human body 130. For example, any path through which the vibration generated by the actuator 120 is input back to the microphone 150 may be the echo path 140. The signal input to the microphone 150 through the echo path 140 causes an echo and thus deteriorates sound quality of the speech signal input to the microphone 150. Thus, the signal input to the microphone 150 is delivered to a communicator 110 after passing through an echo removal and/or reduction process. In an exemplary embodiment, the echo removal and/or reduction process is a process for removing and/or reducing the echo component input through the echo path 140. By removing and/or reducing the echo component from the signal input to the microphone 150 with post-speech signal processing, sound quality may be improved. In addition, a background noise input to the microphone 150 may be removed and/or reduced together with the echo component, thereby further improving sound quality. Hereinafter, the disclosure may refer to removal and/or reduction of a signal, such as, for example an echo signal, a noise signal, or the like, simply as removal for convenience and ease of explanation. However, it will be understood that the term removal, removed, removes etc. may refer to removal and/or reduction and is not intended to be limited to complete removal. The communicator 110 transmits the echo-removed speech signal to an external device, for example, a mobile device such as a smartphone, a tablet PC, or the like.

Figure 2:
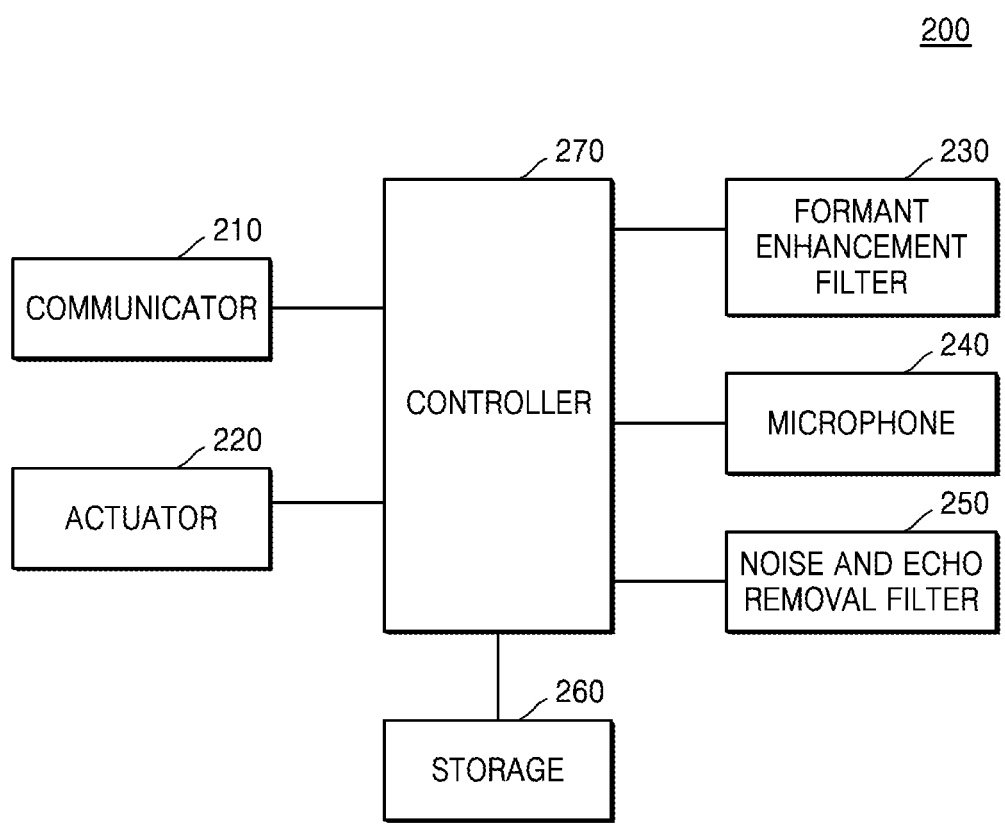
FIG. 2 is a block diagram illustrating an internal structure of an apparatus for processing a speech signal according to an exemplary embodiment.

FIG. 2 is a block diagram illustrating an internal structure of an apparatus for processing a speech signal (or a speech signal processing apparatus 200) according to an exemplary embodiment.

Referring to FIG. 2, the speech signal processing apparatus 200 may include a communicator (e.g., including communication circuitry) 210, an actuator (e.g., including actuating circuitry) 220, a formant enhancement filter 230, a microphone 240, a noise and echo removal filter 250, a storage 260, and a controller (e.g., including processing circuitry) 270. In the exemplary embodiment, the speech signal processing apparatus 200 may, for example, be a wearable device, especially, a smart watch. However, the apparatus may be one of various devices capable of delivering a signal using a human body as a medium, without being limited to the above examples.

The communicator 210 transmits and receives data under control of a controller 270. For example, the communicator 210 communicates with an external device, for example, a mobile device such as a smartphone and a tablet PC, or the like. According to an exemplary embodiment, the communicator 210 receives a speech signal from the external device or transmits the speech signal to the external device.

The actuator 220 generates vibration and outputs a corresponding signal under control of the controller 270. For example, the actuator 220 receives a speech signal passing through a sound quality improvement process and outputs the speech signal in the form of vibration. According to an exemplary embodiment, the actuator 220 outputs the speech signal to which a formant enhancement filter 230 is applied through a human body under control of the controller 270.

The formant enhancement filter 230 is configured to increase a formant of the speech signal to be output through the actuator 220 under control of the controller 270. For example, the formant enhancement filter 230 in advance reinforces a part of the speech signal where a loss is likely to occur due to medium characteristics of the human body as the signal output through vibration from the actuator 220 passes through the human body. According to an exemplary embodiment, the formant enhancement filter 230 may be configured by the controller 270 and may be implemented as a window function for reinforcing a gain of a frequency band. The window function may be one of various window functions such as a Hamming window, a Hanning window, and so forth.

A microphone 240 receives an audio signal. According to an exemplary embodiment, the microphone 240 receives an audio signal including an audio signal including a user speech signal and a speech signal to which the formant enhancement filter 230 is applied. The user speech signal is a signal the user desires to deliver to a counterpart. A signal remaining except for the user speech signal from the audio signal is a background noise which is an unnecessary signal generated by a surrounding environment. The speech signal to which the formant enhancement filter 230 is applied includes an echo component that causes an echo.

A noise and echo removal filter 250 removes a noise component and the echo component under control of the controller 270. For example, if the vibration generated by the actuator 120 is input back to the microphone 240 after passing through the air or a structure of the speech signal processing apparatus 200 or being reflected from the human body, the noise and echo removal filter 250 removes the noise component and the echo component. By removing the echo component from the signal input to the microphone 240 with post-speech signal processing, sound quality may be improved. The noise and echo removal filter 250 also removes the background noise generated due to the surrounding environment, thus further improving sound quality. According to an exemplary embodiment, the noise and echo removal filter 250 may be configured by the controller 270.

A storage 260 stores programs and data necessary for operations of the speech signal processing apparatus 200. The storage 260 may be a volatile storage medium, a nonvolatile storage medium, or a combination thereof. The volatile storage medium may include a semiconductor memory such as a random access memory (RAM), a dynamic random access memory (DRAM), or a synchronous random access memory (SRAM), and the nonvolatile storage medium may include a hard disk, a flash NAND memory, a read-only memory (ROM), an electrically erasable programmable read-only memory (EEPROM), a programmable read-only memory (PROM), a magnetic memory, a magnetic disk, and an optical disk. In an exemplary embodiment, the storage 260 stores data such as the speech signal received through the communicator 210, the audio signal input through the microphone 240, the speech signal to which the formant enhancement filter 230 is applied, and/or the audio signal to which the noise and echo removal filter 250 is applied.

The controller 270 is configured to control overall operations of the speech signal processing apparatus 200. For example, the controller 270 is configured to control overall operations of speech signal processing.

A description will be provided of an operation of the controller 270 in which, when a speech signal is delivered using a human body as a medium, sound quality degraded by medium characteristics of the human body is improved to enhance clarity of the speech signal. A brief process will be described with reference to FIG. 3.

Figure 3:
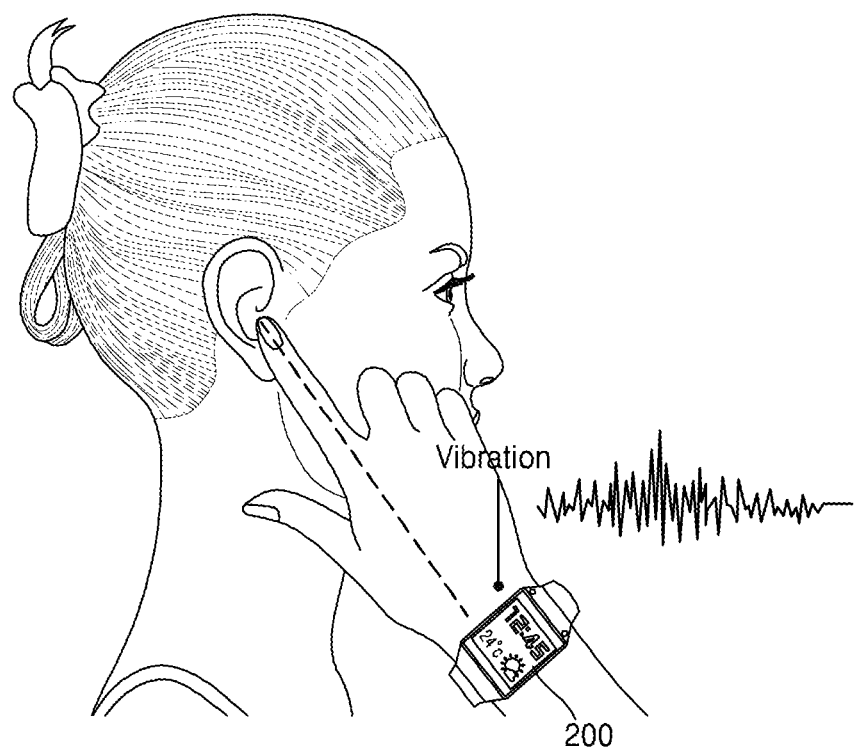
FIG. 3 is a diagram illustrating a delivering a speech signal, to which a formant enhancement filter is applied through a human body used as a medium, by using a wearable device according to an exemplary embodiment.

FIG. 3 is a diagram illustrating a delivering a speech signal to which a formant enhancement filter is applied through a human body as a medium using a wearable device according to an exemplary embodiment.

In FIG. 3, the user performs voice communication using a smart watch 200. The smart watch 200 receives a speech signal of a communication counterpart. The smart watch 200 having received the speech signal generates vibration and delivers the received speech signal through the human body, and the user hears the speech signal by bringing a body part, for example, a fingertip, into contact with the ear. In this example, the speech signal delivered through vibration is attenuated or distorted due to medium characteristics of the human body, degrading quality of sound or reducing clarity of sound. Thus, in the exemplary embodiment, a formant closely related to clarity of speech may be reinforced in advance against attenuation or distortion of the speech signal. Consequently, the clarity of the speech signal arriving at the fingertip through the body may be improved, thus enhancing sound quality of speech.

Referring back to FIG. 2, according to the exemplary embodiment, the controller 270 is configure to control the communicator 210 to receive the speech signal, to estimate at least one formant frequency from the speech signal based on linear predictive coding (LPC), to estimate a bandwidth of the at least one formant frequency, to determine whether the speech signal is a voiced sound or a voiceless sound, to configure the formant enhancement filter 230 based on, for example, the at least one formant frequency, the bandwidth of the at least one formant frequency, characteristics of the determined voiced or voiceless sound, to apply the formant enhancement filter 230 to the speech signal, and to control the actuator 220 to output the speech signal to which the formant enhancement filter 230 is applied through the human body.

According to the exemplary embodiment, the controller 270 is configured to obtain a linear predictive coding coefficient (LPCC) through linear predictive coding analysis when estimating the at least one formant frequency, to obtain a linear predictive coding envelope based on a linear predictive coding coefficient, and to estimate, as the formant frequency, a frequency at which a slope of the linear predictive coding envelope becomes a negative value from a positive value.

The controller 270 may be configured to receive the speech signal through the communicator 210 and to obtain the LPCC through, for example, $10^{th}$-order linear predictive coding (LPC) analysis while performing discrete Fourier transform (DFT) on the speech signal.

The controller 270 may be configured to obtain an LPC envelope based on the obtained LPCC. The controller 270 may be configured to perform DFT on the LPCC and to take a reciprocal of the DFT value to determine a Z-transform digital frequency response. Thereafter, the controller 270 may be configured to determine a complex absolute value of a frequency index of each Z-transform digital frequency response and to take the logarithm of the complex absolute value, thus obtaining a LPC envelope. For example, let a clear speech signal received through the communicator 210 be y(t), LPCCs be a(p+1), and p be an order of an LPCC. Then, short-time Fourier transform (STFT) of the signal and each LPCC may be expressed as Y(i, k) and A(i, k), respectively. Herein, i represents a frame index and k represents a frequency index. The controller 270 determines a Z-transform digital frequency response H(z) using LPCCs as below.

$$H(z) = \frac{G}{A(z)} = \frac{G}{1 - \sum_{l=1}^{p} a_l z^{-l}} \quad (1)$$

Thereafter, the controller 270 defines each frequency index $F_k$ as below to obtain an LPC envelope using the frequency response H(z) with Equation (1).

$$F_k \ln(|H(z)|) \quad (2)$$

The controller 270 obtains an LPC envelope using the frequency index $F_k$ defined with Equation (2).

Moreover, the controller 270 may be configured to estimate a formant frequency using a change in a slope of an LPC envelope. According to an exemplary embodiment, the controller 270 may be configured to determine a frequency at which a slope of an LPC envelope becomes a negative value from a positive value using Equation (3), and to estimate the determined frequency as a formant frequency FF.

$$FF = k, \frac{dF(k)}{dk} = 0 \text{ and } \frac{dF(k+1)}{dk} < 0 \quad (3)$$

According to an exemplary embodiment, the controller 270 may be configured to estimate a bandwidth of at least one formant frequency FF based on LPCCs. The controller 270 may be configured to express an LPCC in the form of a $10^{th}$-order polynomial to determine a complex root and a real root using, for example, a Bairstow method, and to estimate a bandwidth of each formant frequency FF using the determined complex root and real root. For example, an LPCC P(z) may be expressed as a $10^{th}$-order polynomial as below.

$$P(z) = z^m + a_{m-1} z^{m-1} + \ldots + a_1 z + a_0 \approx z^m \quad (4)$$

The controller 270 may then be configured to determine the real root or the complex root of the $10^{th}$-order polynomial of the Z-transform digital frequency response H(z) and the LPCC P(z). To obtain the roots, the Bairstow method may, for example, be used.

$$H(z) = \frac{G}{\prod_{i=1}^{P}(1 - p_i z^{-1})}, \quad p_k = r_k e^{j\omega_k} \quad (5)$$

The controller 270 may be configured to obtain a bandwidth $B_k$ corresponding to each formant frequency $F_S$ using the roots obtained using Equation (5) as below.

$$B_k = -\frac{F_S}{\pi} \ln(r_k) \quad (6)$$

According to an exemplary embodiment, when determining whether the speech signal is a voiced sound or a voiceless sound, the controller 270 may be configured to determine whether the speech signal is a voiced sound or a voiceless sound based on an LPC envelope. For example, the controller 270 may be configured to determine whether the speech signal is a voiced sound or a voiceless sound based on conditions of Equation (7). For example, the controller 270 is configured to determine that the speech signal is a voiced sound if the conditions of Equation (7) are satisfied. Herein, $N_{AV}$ indicates an average of formant values of a frame and $N_{pt}$ indicates a size when DFT is performed.

$$\text{Voiced Signal, } A_{max} < 2N_{AV} \text{ or } L_{max} < N_{pt}/4 \text{ or } A_{MX} < N_{AV}/2 \quad (7)$$

$$A_{max} = \text{MAX}(H(L_{max}))$$

$$A_{MX} = \text{MAX}(S_{R1}, S_{R2}, S_{R3}, S_{R5})$$

$$S_{R1} = \sum_{k=0}^{(N_{pt}/8)-1} H(k), \quad S_{R2} = \sum_{k=N_{pt}/8}^{(N_{pt}/4)-1} H(k)$$

$$S_{R3} = \sum_{k=N_{pt}/4}^{(3N_{pt}/8)-1} H(k), \quad S_{R4} = \sum_{k=3N_{pt}/8}^{(N_{pt}/2)-1} H(k)$$

According to an exemplary embodiment, the controller 270 may configure the formant enhancement filter 230 based on the formant frequencies, the bandwidth of the formant frequencies, characteristics of the determined voiced signal or non-voiced signal, and signal delivery characteristics of the human body. The controller 270 may configure the formant enhancement filter 230 to reinforce in advance a part where a loss may occur due to medium characteristics of the body when the signal output through vibration from the actuator 220 passes through the human body.

For example, the controller 270 may be configured to determine, for example, a Hamming window modified for a bandwidth of each formant frequency, taking the characteristics of the voiced or non-voiced signal into account, based on Equation (8), and to determine a peak value of the modified Hamming window based on the characteristics of the body. The characteristics of the body may be determined by dividing a spectrum of an impulse response to the body by a spectrum of a frequency response.

$$G(n,k) = \left(\frac{h(n) - \min(h)}{1 - \min(h)} + 1\right)^{a(i,k)} \quad (8)$$

$$a(i,k) = \frac{\log(|FR(i,k)|)}{\log(|Y(i,k)|)}$$

$$h(n) = 0.54 - 0.46\cos\left(2\pi\frac{n}{N}\right)$$

Herein, a represents a peak value of a Hamming window modified considering characteristics of the voiced sound or the voiceless sound and characteristics of the human body. h(n) represents the Hamming window, and FR(i,k) represents a frequency response of the human body.

According to an exemplary embodiment, the controller 270 may be configured to apply the formant enhancement filter 230 to the speech signal, and to control the actuator 220 to output the speech signal to which the formant enhancement filter 230 is applied through the human body. For example, the controller 270 may be configured to apply the modified Hamming window to a frequency index corresponding to a formant frequency in a frequency domain of the speech signal on which DFT is initially performed, using, for example, Equation (9) provided below.

$$Y_{enh}(i,k) = GY(i,k) \quad (9)$$

According to an exemplary embodiment, it is possible to address the problem of deterioration of sound quality of voice or reduction of clarity of voice due to attenuation or distortion of a signal output through the apparatus 200 due to medium characteristics of the human body when the signal passes through the human body. For example, by performing pre-speech signal processing before outputting the speech signal to enhance in advance a part where the quality of the speech signal may be degraded during delivery of the speech signal, the clarity of the speech signal may be improved in spite of sound quality degradation during the delivery of the speech signal. For example, to minimize and/or reduce a difference between a formant of the original speech signal and a formant of the delivered speech signal, a gain value in the form of a window modified considering medium characteristics of the human body may be applied, thus improving the clarity of the speech signal.

Moreover, according to an exemplary embodiment, taking a formant frequency and a formant bandwidth that may vary from speaker to speaker into account, a proper formant enhancement filter may be applied, thus improving the quality of the speech signal in a more precise way.

Figure 4:
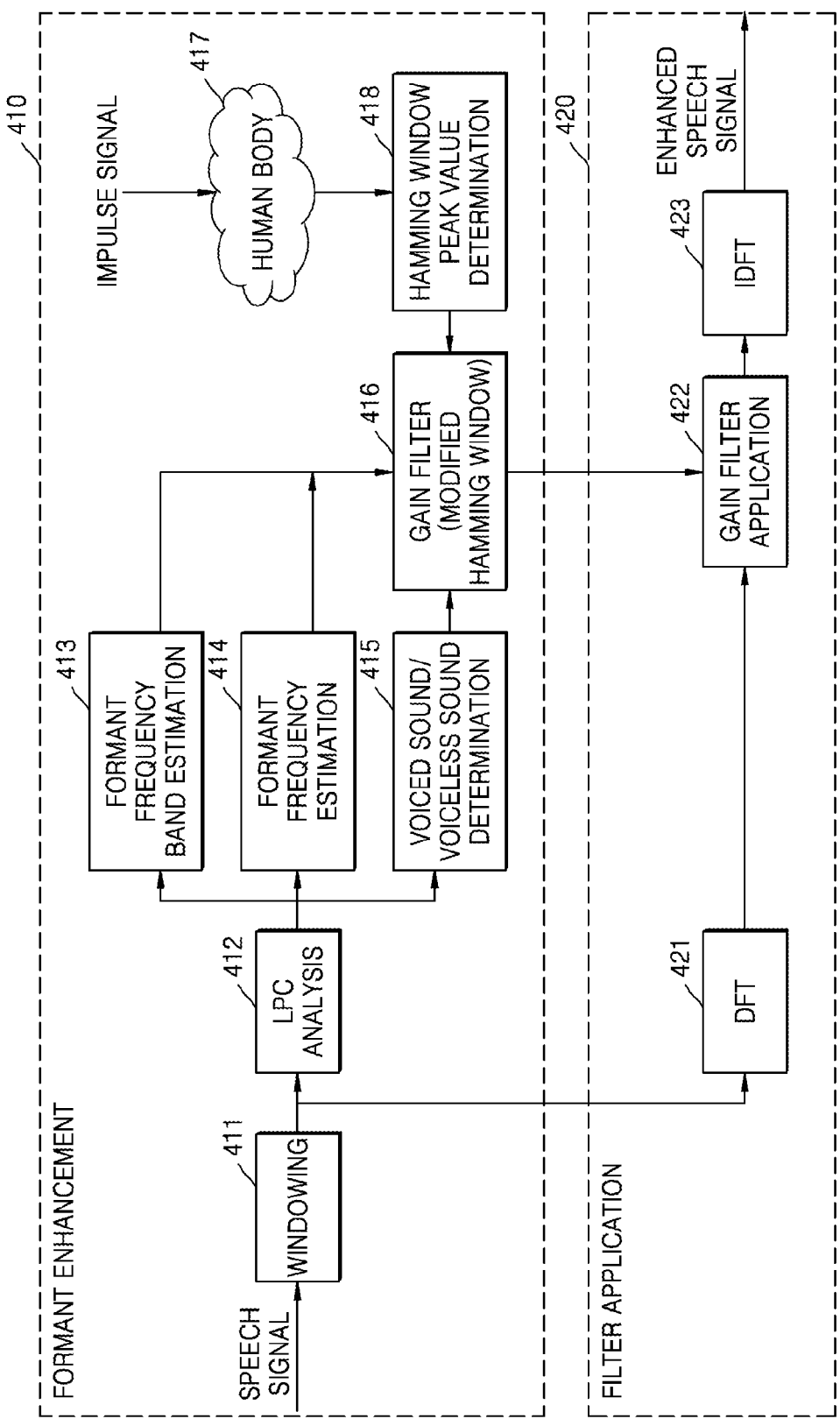
FIG. 4 is a schematic block diagram illustrating a process of applying a formant enhancement filter to a speech signal and outputting a resulting signal by an apparatus for processing a speech signal according to an exemplary embodiment.

FIG. 4 is a schematic operational block diagram illustrating a process of applying a formant enhancement filter to a speech signal and outputting a resulting signal by the apparatus 200 for processing a speech signal according to an exemplary embodiment.

In FIG. 4, operations of the apparatus 200 according to an exemplary embodiment are divided into formant enhancement 410 and filter application 420.

As to formant enhancement 410, the speech signal processing apparatus 200 receives a speech signal and performs windowing 411 in operation 411. Thereafter, the speech signal processing apparatus 200 performs LPC analysis with respect to the windowed speech signal in operation 412. With respect to the analyzed speech signal, a formant frequency band is estimated in operation 413, a formant frequency is estimated in operation 414, and it is determined whether the speech signal is a voiced sound or a voiceless sound in operation 415. The speech signal processing apparatus 200 applies an impulse signal to a medium, for example, a human body 417, and determines a peak value of, for example, a Hamming window from a response to the impulse signal in operation 418. The speech signal processing apparatus 200 generates a gain filter, that includes, a modified Hamming window based on the obtained frequency band, formant frequency, characteristics of the voiced sound or voiceless sound, and peak value of the Hamming window in operation 416.

As to filter application 420, the speech signal processing apparatus 200 performs DFT with respect to the windowed speech signal in operation 421. The speech signal processing apparatus 200 applies the gain filter generated in operation 416 to the DFT speech signal in operation 422. In operation 423, the speech signal processing apparatus 200 performs inverse DFT (IDFT) with respect to the gain-filter-applied signal and outputs an enhanced speech signal in operation 423.

By generating and applying a formant enhancement filter to a received speech signal, clarity of the speech signal may be improved.

Figure 5:
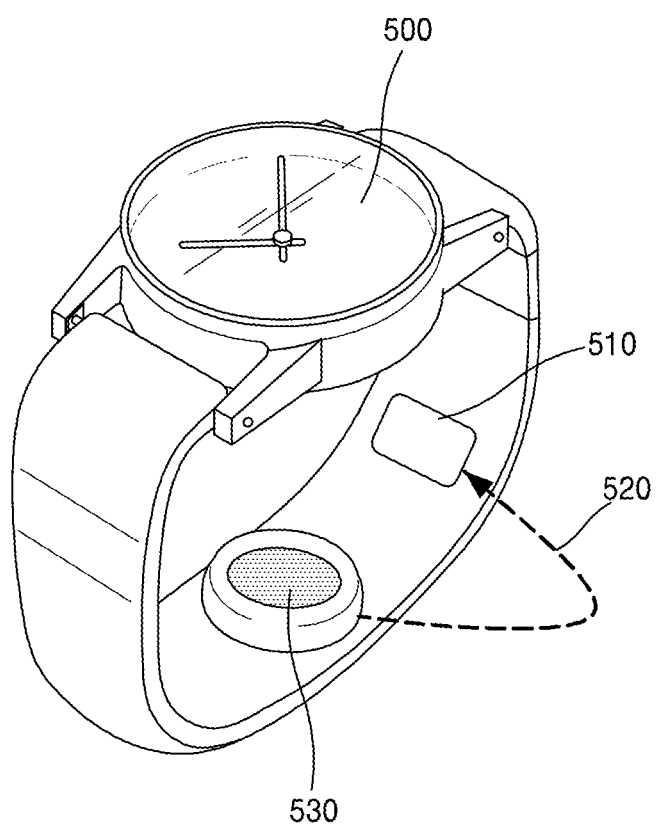
FIG. 5 is a diagram illustrating a wearable device that can be used to input a user's speech according to an exemplary embodiment.

A description has been made of the operation of the controller 270 that improves clarity of a speech signal by performing a function of improving sound quality deteriorated due to medium characteristics of a human body during delivery of the speech signal using the human body as a medium. A description will now be made of the operation of the controller 270 that performs a function of removing and/or reducing an echo generated by vibration. With reference to FIG. 5, a brief description will be provided.

FIG. 5 is a diagram illustrating an electronic device and a process of inputting user's speech through a wearable device according to an exemplary embodiment.

In FIG. 5, voice communication may, for example, be performed using a smart watch 500 like in the case illustrated in FIG. 3. As mentioned before, when the smart watch 500 receives a speech signal from a counterpart, an actuator 530 included in the smart watch 500 generates vibration and delivers the received speech signal through a human body. A user of the smart watch 500 may also deliver the speech signal to the counterpart by using a speaker 510 included in the smart watch 500. In this example, due to an acoustics environment around the user, that is, an indoor environment of a running vehicle, a place where many persons have conversations, a street including a driveway, a road on which may persons come and go, or the like, a background noise may be generated, thus distorting a speech signal. Vibration generated by the actuator 530 may also be input back to a microphone 510 through a structure of the smart watch 500, for example, a band or a main body, causing an echo. Thus, in an exemplary embodiment, the background noise input to the microphone 510 and the echo component may be removed and/or reduced integrally. According to an exemplary embodiment, instead of removing noise before or after removing an echo, the background noise and the echo component are removed in an integrated manner, thereby improving speech sound quality without causing distortion.

Referring back to the description of FIG. 2, the controller 270 may be configured to estimate power with respect to an echo component based on the speech signal to which the formant enhancement filter 230 is applied and which is input back through the microphone 240, to obtain echo power, and to estimate power of a background noise input through the microphone 240 to obtain noise signal power, to combine the echo power with the noise signal power to obtain combined power, to configured a noise and echo removal filter 250 based on the combined power, to receive an audio signal including a user speech signal through the microphone 240, and to apply the noise and echo removal filter 250 to the input audio signal to estimate the user speech signal included in the audio signal.

According to an exemplary embodiment, when obtaining the echo power, the controller 270 may be configured to estimate a gain value filter based on the speech signal to which the formant enhancement filter 230 is applied, to obtain a magnitude spectrum with respect to the echo component using the estimated gain value filter, and to perform smoothing using the obtained magnitude spectrum and previously estimated echo power, thus obtaining current echo power.

For example, the controller 270 may be configured to receive an audio signal through the microphone 240 and to perform DFT. Thereafter, the controller 270 may be configured to estimate the gain value filter using the speech signal to which the formant enhancement filter 230 is applied and which is output through the actuator 220, and a value obtained from DFT. For example, let a user speech signal input through a near end, for example, the microphone 240 be s(t), let a speech signal to which the formant enhancement filter 230 is applied and which is input back to the microphone 240 after passing through the air or being reflected from the human body be e(t), and let a background noise be d(t). Then, absence of the user speech signal input through the microphone 240 may be defined as $H_0$: y(t)=d(t)+e(t) and existence of the speech signal at the near end may be defined as $H_1$: y(t)=d(t)+e(t)+s(t). After these signals undergo short-time Fourier transform (STFT), $H_0$ and $H_1$ may be expressed as follows:

$$H_0: Y(i,k)=D(i,k)+E(i,k)$$

$$H_1: Y(i,k)=D(i,k)+E(i,k)+S(i,k) \quad (10),$$

where i represents a frame index and k represents a frequency index.

In this example, the gain value filter H(i, k) may be defined as:

$$H(i,k) = \frac{|E[X_d^*(i,k)Y(i,k)]|}{|E[X_d^*(i,k)X_d(i,k)]|}, \quad (11)$$

where $X_d(i,k)$ represents the speech signal at the near end, and $X_d^*(i,k)$ represents a conjugate of $X_d(i,k)$. The controller 270 may be configured to obtain a magnitude spectrum of an echo component based on the defined gain value filter by using:

$$|\hat{E}(i,k)|=H(i,k)|X_d(i,k)| \quad (12)$$

The controller 270 may be configured to estimate current echo power $\hat{\lambda}_e(i,k)$ as below.

$$\hat{\lambda}_e(i,k)=\alpha_{\lambda e}\hat{\lambda}_e(i-1,k)+(1-\alpha_{\lambda e})|\hat{E}(i,k)|^2 \quad (13),$$

where $\alpha_{\lambda e}$ represents a smoothing parameter.

According to an exemplary embodiment disclosed with reference to FIG. 7, the controller 270 may be configured to estimate power of a background noise input through the microphone 240 to obtain noise signal power, and to perform smoothing using echo power, noise signal power, and previously combined power when obtaining combined power by combining the echo power with the noise signal power, to obtain current combined power. For example, the controller 270 may be configured to obtain noise signal power based on the power of the background noise and the magnitude spectrum of the echo component. Moreover, the controller 270 may be configured to estimate current combined power $\hat{\lambda}_{cd}(i,k)$ by performing long-term smoothing based on the echo power, the noise signal power, and the previously combined power, using:

$$\hat{\lambda}_{cd}(i,k)=\alpha_{\lambda cd}\hat{\lambda}_{cd}(i-1,k)+1-\alpha_{\lambda cd})\{\hat{\lambda}(i,k)+E[|D(i,k)|^2|Y(i,k)|]\} \quad (14)$$

where $\alpha_{\lambda cd}$ represents a long-term smoothing parameter.

According to an exemplary embodiment, when configuring the noise and echo removal filter 250 based on the combined power, the controller 270 may be configured to estimate a first prior signal-to-combined power ratio (SCR) and a posteriori SCR, to estimate a second prior SCR in a decision-direction way based on the combined power, the posteriori SCR, and power of the previous speech signal, and to configure the noise and echo removal filter 250 based on the second prior SCR. The noise and echo removal filter 250 may, for example, be a Wiener filter. The controller 270 configures the noise and echo removal filter 250 to remove the echo generated by vibration of the actuator 220 and the background noise input through the microphone 240.

For example, the controller 270 may be configured to estimate the prior SCR and the posteriori SCR by using Equation (15). For example, by using the current combined power, a prior SCR γ(i,k) and a posteriori SCR ξ(i,k) may be estimated.

$$\gamma(i,k) = \frac{|Y(i,k)|^2}{\lambda_{cd}(i,k)}, \xi(i,k) = \frac{\lambda_s(i,k)}{\lambda_{cd}(i,k)}, \quad (15)$$

where $\lambda_s(i,k)$ represents a dispersion of a speech signal input to the microphone 240.

Thereafter, the controller 270 may be configured to estimate a new prior SCR $\hat{\xi}(i,k)$ in a decision-direction way by using a decision-direction parameter $\alpha_{DD}$ as below.

$$\hat{\xi}(i,k) = \alpha_{DD}\frac{|\hat{S}(i-1,k)|^2}{\hat{\lambda}_{cd}(i-1,k)} + (1-\alpha_{DD})P[\gamma(i,k)-1] \quad (16)$$

The controller 270 configures the noise and echo removal filter 250 G(i,k) based on the newly estimated prior SCR as given below.

$$G(i,k) = \frac{\hat{\xi}(i,k)}{1+\hat{\xi}(i,k)} \quad (17)$$

According to an exemplary embodiment, when estimating a user speech signal included in an audio signal, the controller 270 may be configured to compare a posteriori SCR with a threshold value for the same to determine an indicator function value, to estimate a prior probability of a current speech signal being absent based on and the indicator function value and a prior probability of a previous speech signal being absent, to determine a likelihood ratio based on the first prior SCR, the posteriori SCR, and the second prior SCR, to determine a probability of a speech signal being present based on the prior probability of the current speech signal being absent and the likelihood ratio, and to estimate the user speech signal based on the noise and echo removal filter and the probability of the speech signal being present. For example, the controller 270 may be configured to compare the posteriori SCR with the threshold value for the same and determines the indicator function value I(i,k) to be 0 or 1. Thereafter, the controller 270 may be configured to estimate a prior probability q(i,k) of the current speech signal being absent through smoothing based on the indicator function value and the prior probability of the previous speech signal being absent, as below.

$$q(i,k) = \alpha_q q(i-1,k) + (1-\alpha_q) I(i,k) \qquad (18)$$

The controller 270 may be configured to determine a likelihood ratio $\Lambda(Y(i,k))$ based on the prior SCR $\gamma(i,k)$ and the posteriori SCR $\xi(i,k)$, which are estimated using the current combined power with Equation (15), as below.

$$\Lambda(Y(i,k)) = \frac{1}{1+\xi(i,k)} \exp\left[\frac{\gamma(i,k)\xi(i,k)}{1+\xi(i,k)}\right] \qquad (19)$$

The controller 270 may be configured to determine a probability $p(H_0|Y(i,k))$ of a current speech signal being absent based on the determined likelihood ratio $\Lambda(Y(i,k))$ and the prior probability q(i,k) of the current speech signal being absent using Equation (20). Once the probability of the current speech signal being absent is determined, a probability $(1-p(H_0|Y(i,k)))$ of the speech signal currently existing may also be determined.

$$p(H_0|Y(i,k)) = 1/(1+q\Lambda(Y(i,k))) \qquad (20)$$

Moreover, the controller 270 may be configured to estimate a current speech signal $\hat{S}(i,k)$ by multiplying the probability $(1-p(H_0|Y(i,k)))$ of the speech signal currently existing, the noise and echo removal filter G(i,k), and the audio signal input to the microphone 240, as below.

$$\hat{S}(i,k) = (1-p(H_0|Y(i,k))) G(i,k) Y(i,k) = \tilde{G}(i,k) Y(i,k) \qquad (21)$$

According to an exemplary embodiment, using a technique for integrally removing an acoustics echo and a background noise of a human body environment, in spite of existence of noise in the human body environment, only a clear speech sound of the user may be estimated, thus improving the quality of the speech sound. According to an exemplary embodiment, instead of removing noise before or after removing the echo, the noise and the echo component are integrally removed, avoiding distortion, and only a clear speech signal from which an acoustics echo of the human body environment is removed is estimated, thus improving the quality of the speech sound.

Figure 6:
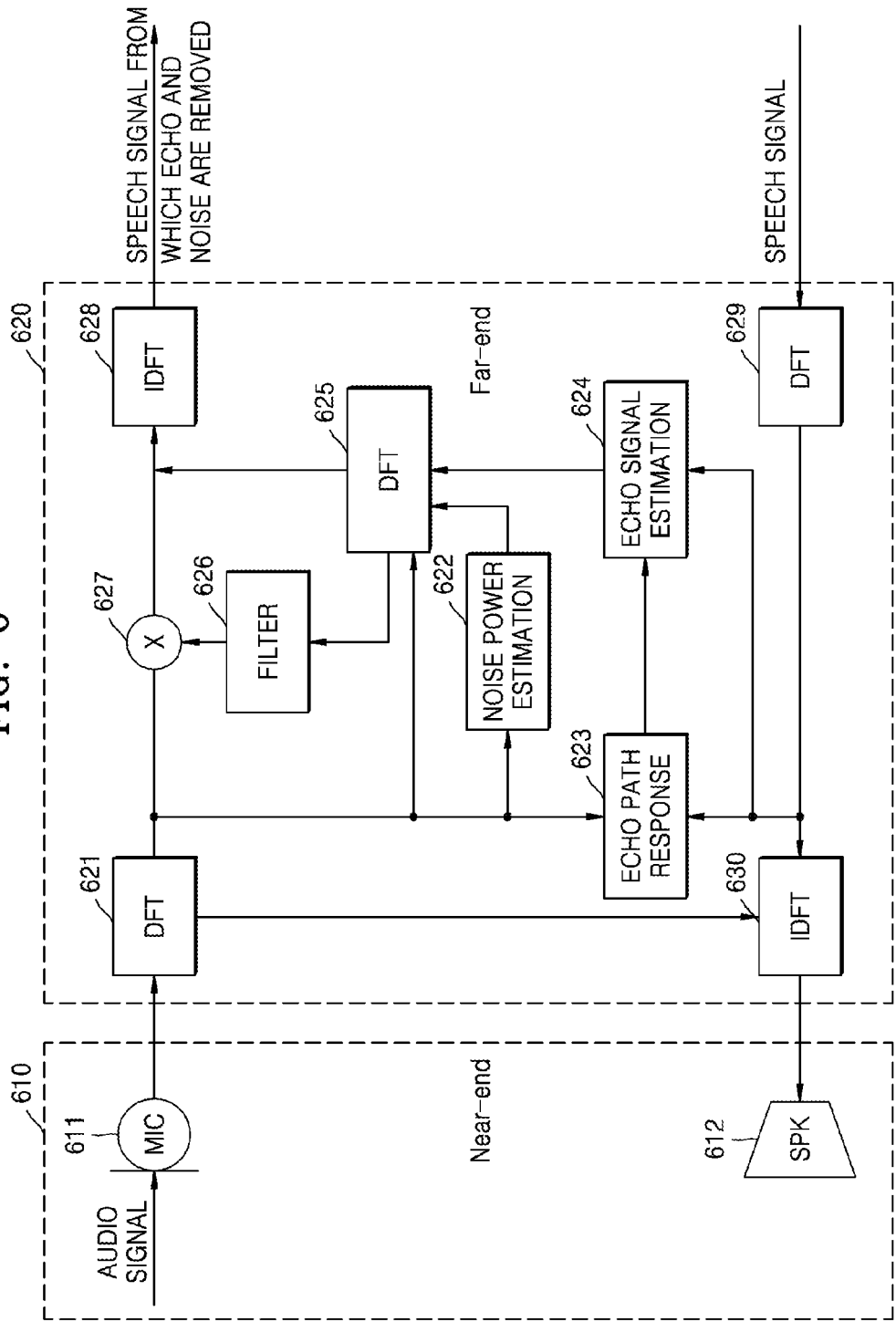
FIG. 6 is a schematic block diagram illustrating a process of removing an echo by an apparatus for processing a speech signal according to an exemplary embodiment.

FIG. 6 is a schematic operational block diagram illustrating a process of removing an echo by an apparatus for processing a speech signal according to an exemplary embodiment.

In FIG. 6, the operations of the speech signal processing apparatus 200 according to an exemplary embodiment are divided into operations at a near end 610 and operations at a far end 620. The operations at the near end 610 include, for example, operations of a microphone 611 and a speaker 612 of the speech signal processing apparatus 200. The operations at the far end 620 include, for example, an operation of processing a speech signal and delivering the speech signal to an external device and an operation of receiving the speech signal from the external device.

The speech signal processing apparatus 200 receives an audio signal through the microphone 611 and performs DFT in operation 621. The audio signal input through the microphone 611 may include a user speech signal, a signal including an echo component, and/or a background noise. The user speech signal is a signal the user desires to deliver to the counterpart. The background noise is an unnecessary signal generated by the surrounding environment. The signal including the echo component, which may cause an echo, is a speech signal to which a formant enhancement filter is applied. The speech signal processing apparatus 200 estimates noise power with respect to the background noise in operation 622, obtains a response to the signal including the echo component applied through an echo path in operation 623, and estimates an echo signal in operation 624. The speech signal processing apparatus 200 estimates an integrated signal based on the noise power and the echo signal in operation 625, and generates a noise and echo removal filter based on the integrated signal in operation 626. The speech signal processing apparatus 200 applies the noise and echo removal filter to the DFT speech signal in operation 627, and performs IDFT with respect to the signal to which the gain filter is applied and transmits a reinforced speech signal to an external device in operation 628.

In this way, by removing the echo in the integrated form of the echo and the noise, a user's clear speech sound may be estimated, thus improving the quality of the speech sound.

The speech signal processing apparatus 200 performs DFT on the speech signal received from the external device in operation 629, and performs IDFT on the DFT speech signal and outputs the IDFT speech signal to the speaker 612 in operation 630. In this process, as described with reference to FIG. 4, the formant enhancement filter may be applied to the speech signal which is then output.

Although it has been described with reference to FIG. 2 and above that the controller 270 is illustrated as a single block to control an overall operation of speech signal processing, this operation may not be necessarily performed by the controller 270 alone. Some of functions performed by the controller 270 may be performed by a functional unit expressed as a separate block. For example, a function of estimating at least one formant frequency from a speech signal based on LPC may be performed by a frequency estimation unit (not shown). A function of estimating a bandwidth of the at least one formant frequency may be performed by a frequency bandwidth estimation unit (not shown). A function of determining whether a speech signal is a voiced sound or a voiceless sound may be performed by a voiced/voiceless sound determination unit (not shown). A function of configuring the formant enhancement filter 230 based on a formant frequency, a bandwidth of the formant frequency, characteristics of the determined voiced sound or voiceless sound, and signal delivery characteristics of the human body may be performed by a formant enhancement filter configuring unit (not shown).

A function of obtaining echo power by estimating power with respect to an echo component based on a speech signal to which a formant enhancement filter is applied and which is input back through the microphone 240 may be performed by an echo power obtaining unit (not shown). A function of estimating power of a background noise input through the microphone 240 and obtaining noise signal power may be performed by a noise signal power obtaining unit (not shown). A function of combining the echo power with the noise signal power to obtain combined power may be performed by a combined power obtaining unit (not shown).

A function of configuring the noise and echo removal filter 250 based on the combined power may be performed by a noise and echo removal filter configuring unit (not shown). A function of applying the noise and echo removal filter 250 to the input audio signal to estimate the user speech signal included in the audio signal may be performed by a speech signal estimation unit (not shown).

FIG. 7 is a flowchart illustrating a method of applying a formant enhancement filter to a speech signal and outputting a resulting signal according to an exemplary embodiment.

Referring to FIG. 7, the speech signal processing apparatus 200 receives a speech signal in operation 710, and estimates at least one formant frequency from the speech signal based, for example, on LPC in operation 720. According to an exemplary embodiment, the speech signal processing apparatus 200 obtains an LPCC through LPC analysis, obtains an LPC envelope based on the LPCC, and estimates, as a formant frequency, a frequency at which a slope of the LPC envelope becomes a negative value from a positive value.

In operation 730, the speech signal processing apparatus 200 estimates a bandwidth of the at least one formant frequency. According to an exemplary embodiment, the speech signal processing apparatus 200 may estimate the bandwidth of the at least one formant frequency based on the LPCC.

In operation 740, the speech signal processing apparatus 200 determines whether the speech signal is a voiced sound or a voiceless sound. According to an exemplary embodiment, the speech signal processing apparatus 200 may determine based on the LPC envelope whether the speech signal is a voiced sound or a voiceless sound.

In operation 750, the speech signal processing apparatus 200 configures a formant enhancement filter based on the formant frequencies, the bandwidth of the formant frequencies, characteristics of the determined voiced sound or voiceless sound, and signal delivery characteristics of the human body. The formant enhancement filter may, for example, be a window function that reinforces the gain of the formant frequency band.

The speech signal processing apparatus 200 applies the formant enhancement filter to the speech signal in operation 760, and outputs the speech signal to which the formant enhancement filter is applied in operation 770.

FIG. 8 is a flowchart illustrating an example method of removing an echo according to an exemplary embodiment.

Operations illustrated in FIG. 8 may be additionally performed after the operations illustrated in FIG. 7 are performed. For example, the operations illustrated in FIG. 8 may be performed after the formant enhancement filter is applied to the speech signal and the filter-applied speech signal is output.

In operation 810, the speech signal processing apparatus 200 obtains echo power by estimating power with respect to an echo component based on the speech signal to which the formant enhancement filter is applied and which is input back through the microphone. According to an exemplary embodiment, the speech signal processing apparatus 200 estimates a gain value filter based on the speech signal to which the formant enhancement filter is applied, obtains a magnitude spectrum of the echo component by using the estimated gain value filter, and performs smoothing using the obtained magnitude spectrum and the echo power estimated previously, thus obtaining the current echo power.

In operation 820, the speech signal processing apparatus 200 obtains noise signal power by estimating power of the background noise input through the microphone.

In operation 830, the speech signal processing apparatus 200 obtains combined power by combining the echo power with the noise signal power. According to an exemplary embodiment, the speech signal processing apparatus 200 obtains current combined power by performing smoothing with respect to the echo power, the noise signal power, and the previously combined power.

In operation 840, the speech signal processing apparatus 200 configures the noise and echo removal filter based on the combined power. According to an exemplary embodiment, the speech signal processing apparatus 200 estimates a first prior SCR and a posteriori SCR based on the combined power, estimates a second prior SCR in a decision-direction way based on the combined power, the posteriori SCR, and the power of the previous speech signal, and configures the noise and echo removal filter based on the second prior SCR.

Next, in operation 850, the speech signal processing apparatus 200 receives an audio signal including a user speech signal through the microphone.

In operation 860, the speech signal processing apparatus 200 estimates the user speech signal included in the audio signal by applying the noise and echo removal filter to the received audio signal. According to an exemplary embodiment, the speech signal processing apparatus 200 compares the posteriori SCR with the threshold value for the same to determine the indicator function value, estimates a prior probability of the current speech signal being absent based on the indicator function value and a prior probability of the previous speech signal being absent, determines a likelihood ratio based on the first prior SCR, the posteriori SCR, and the second prior SCR, determines a probability of the speech signal being present based on the prior probability of the speech signal being currently absent and the likelihood ratio, and estimates the user speech signal based on the noise and echo removal filter and the probability of the speech signal being present.

Meanwhile, the above-described exemplary embodiments may be written as a program that are executable on a computer, and may be implemented on a general-purpose digital computer operating the program by using a computer-readable recording medium.

The computer-readable recording medium may include a storage medium such as a magnetic storage medium (e.g., a read-only memory (ROM), floppy disk, hard disk, or the like), an optical recording medium (e.g., a compact disk (CD)-ROM, a digital versatile disk (DVD), or the like), and carrier waves (e.g., transmission over the Internet).

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An apparatus for processing a speech signal for a wearable device, the apparatus generating vibration based on a speech signal received from an external device and comprising:
   a communicator configured to receive a speech signal received from the external device;
   an actuator configured to generate vibration based on the received speech signal;

a microphone configured to obtain an audio signal comprising a user speech signal articulated by a user of the apparatus; and a processor configured to convert the received speech signal based on impulse response characteristics of a body of the user to which the vibration is to be delivered, and to generate vibration from the converted speech signal, wherein the vibration generated by the actuator is delivered from a first part of the body to a second part of the body, and the microphone is included in a band of the wearable device, the actuator configured to generate the vibration is located spaced apart from the microphone on an inner circumferential surface of the band of the wearable device, and the processor is further configured to convert the received speech signal by applying a filter for enhancing a formant of the received speech signal to the received speech signal based on the impulse response characteristics of the body and to generate the vibration based on the converted speech signal.

2. The apparatus of claim 1, wherein the processor is further configured to create the filter by estimating distortion of the received speech signal generated during the delivery of the vibration generated based on the received speech signal from the first part of the body to the second part of the body, and to convert the received speech signal by using the created filter.

3. The apparatus of claim 1, wherein the processor is further configured to create the filter considering the impulse response characteristics of the body based on a response signal with respect to an impulse signal applied to the body.

4. The apparatus of claim 1, wherein the actuator is located on an inner circumferential surface of a strap of the wearable device, and contacts a wrist part of the user wearing the wearable device.

5. The apparatus of claim 4, wherein the vibration generated by the actuator based on the speech signal is delivered to an ear part of the user from the wrist part of the user contacting the actuator through a finger of the user.

6. The apparatus of claim 1, wherein the processor is further configured to create a removal filter for removing, from the audio signal, an echo signal delivered to the microphone from the vibration generated by the actuator and to remove the echo signal from the audio signal by using the created removal filter.

7. The apparatus of claim 6, wherein the audio signal comprises the user speech signal of the user, the echo signal, and a noise signal around the wearable device, and the processor is further configured to create the removal filter for removing the echo signal and the noise signal, together, from the audio signal.

8. The apparatus of claim 1, wherein the wearable device is a smart watch.

9. The apparatus of claim 1, wherein the processor is further configured to convert the received speech signal by using a filter for previously enhancing a loss of the vibration, occurring during the delivery of the vibration from the first part of the body to the second part of the body.

10. A method of generating vibration based on a speech signal received from an external device by an apparatus for processing a speech signal for a wearable device, the method comprising:

receiving a speech signal received from the external device;

obtaining an audio signal comprising a user speech signal of a user through a microphone of the wearable device;

converting the received speech signal based on impulse response characteristics of the user to which the vibration is to be delivered; and generating vibration from the converted speech signal by using an actuator, wherein the vibration generated by the actuator is delivered from a first part of the body to a second part of the body, and the microphone is included in a band of the wearable device, the actuator configured to generate the vibration is located spaced apart from the microphone on an inner circumferential surface of the band of the wearable device, and the generating of the vibration comprises converting the received speech signal by applying a filter for enhancing a formant of the received speech signal to the received speech signal based on the impulse response characteristics of the body and generating the vibration based on the converted speech signal.

11. The method of claim 10, wherein the converting of the received speech signal comprises creating the filter by estimating distortion of the received speech signal generated during the delivery of the vibration generated based on the received speech signal from the first part of the body to the second part of the body, and converting the received speech signal by using the created filter.

12. The method of claim 10, further comprising applying an impulse signal to the body, wherein the filter is created considering the impulse response characteristics of the body based on a response signal with respect to an impulse signal applied to the body.

13. The method of claim 10, wherein the actuator is located on an inner circumferential surface of a strap of the wearable device, and contacts a wrist part of the user wearing the wearable device.

14. The method of claim 13, wherein the vibration generated by the actuator based on the speech signal is delivered to an ear part of the user from the wrist part of the user contacting the actuator through a finger of the user.

15. The method of claim 10, further comprising:

creating a removal filter for removing, from the audio signal, an echo signal delivered to the microphone from the vibration generated by the actuator; and removing the echo signal from the audio signal by using the created removal filter.

16. The method of claim 15, wherein the audio signal comprises the user speech signal of the user, the echo signal, and a noise signal around the wearable device, and the creating of the removal filter comprises creating the removal filter for removing the echo signal and the noise signal, together, from the audio signal.

17. The method of claim 10, wherein the wearable device is a smart watch.

18. A non-transitory computer-readable recording medium having recorded thereon a program which, when executed by a computer, causes the computer to:

receive a speech signal received from the external device;

obtain an audio signal comprising a user speech signal of a user through a microphone of a wearable device;

convert the received speech signal based on impulse response characteristics of the user to which vibration is to be delivered; and generate vibration from the converted speech signal by using an actuator, wherein the vibration generated by the actuator is delivered from a first part of the body to a second part of the body, and the microphone is included in a band of the wearable device, the actuator configured to generate the vibration is located spaced apart from the microphone on an inner circumferential surface of the band of the wearable device, and the generating of the vibration comprises converting the received speech signal by applying a filter for enhancing a formant of the received speech signal to the received speech signal based on the impulse response characteristics of the body and generating the vibration based on the converted speech signal.

* * * * *